(12) United States Patent
Anderson

(10) Patent No.: US 6,236,311 B1
(45) Date of Patent: May 22, 2001

(54) VARIABLE VEHICLE SIGNALING SYSTEM

(76) Inventor: Murray J. Anderson, 151 Brookmill Drive, Thornhill, Ontario (CA), L4J 6L8

( * ) Notice: Subject to any disclaimer, the term of this patent is extended or adjusted under 35 U.S.C. 154(b) by 0 days.

(21) Appl. No.: 09/428,857

(22) Filed: Oct. 28, 1999

(51) Int. Cl.[7] .................................................. B60Q 1/26
(52) U.S. Cl. ......................... 340/468; 340/464; 340/475; 340/472
(58) Field of Search .................................... 340/468, 472, 340/464, 475, 480, 462, 459, 479, 463

(56) References Cited

U.S. PATENT DOCUMENTS

| | | | |
|---|---|---|---|
| D. 313,865 | 1/1991 | Armacost, Jr. et al. | 454/280 |
| 3,492,638 * | 1/1970 | Lane | 340/464 |
| 3,787,808 * | 1/1974 | Knopf | 340/464 |
| 4,029,991 | 6/1977 | Schultz | 315/135 |
| 4,851,810 * | 7/1989 | Vitale et al. | 340/468 |
| 5,105,179 * | 4/1992 | Smith | 340/468 |
| 5,414,407 | 5/1995 | Gerrans et al. | 340/475 |
| 5,426,414 * | 6/1995 | Flatin et al. | 340/472 |
| 5,430,625 | 7/1995 | Abarr et al. | 362/485 |
| 5,442,332 | 8/1995 | Hughes | 340/467 |
| 5,798,691 * | 8/1998 | Tim Kao | 340/464 |

* cited by examiner

Primary Examiner—Jeffery Hofsass
Assistant Examiner—Daniel Previl

(57) ABSTRACT

A vehicle signaling system is provided including a vehicle with at least one light assembly including an array of lights. Also included is a plurality of inputs situated within the vehicle for generating an activation signal. Control circuitry is connected between the light assembly of the vehicle and the inputs. In use, the control circuitry is adapted to actuate the lights of the light assembly in a unique manner in response to the receipt of activation signals from each combination of the inputs.

5 Claims, 8 Drawing Sheets

VEHICLE ENHANCED SIGNALING SYSTEM (INPUT VS OUTPUTS)

INPUT DEVICES
- L=LEFT
- R=RIGHT
- B=BRAKE
- T=LIGHTS
- H=HAZARD
- I=IGNITION
- E=EMERGENCY
- O=LIGHT OPTION
- F=FRONT OPTION
- P=REAR OPTION

INPUT SYMBOLS
- 1(ONE)=ON
- 0(ZREO)=OFF
- X=DON'T CARE

OUTPUT DEVICES
- LF=LEFT FRONT
- RF=RIGHT FRONT
- LR=LEFT REAR
- RR=RIGHT REAR

OUTPUT SYMBOLS
- H=HAZARD
- A=LIGHTS
- N=NOTHING
- B=BRAKES
- R=RIGHT
- K=RIGHT BRAKE
- L=LEFT
- Y=LEFT BRAKE
- Q=HAZARD BRAKE
- Z=HAZARD TURN
- E=EMERGENCY
- S=SPARKLE

FIG. 2

| INPUTS | | | | | | | | | OUTPUTS | | | |
|---|---|---|---|---|---|---|---|---|---|---|---|---|
| L | R | B | T | H | I | E | O | F | P | LF | RF | RL | RR |
| X | X | X | X | X | 1 | X | X | X | E1 | E2 | E1 | E2 |
| 0 | 0 | 0 | 0 | 0 | 1 | 0 | X | X | X | S1 | S2 | S1 | S2 |
| 1 | 0 | 0 | 0 | 0 | X | 0 | X | 1 | 1 | L | L | L | L |
| 1 | 0 | 0 | 0 | 0 | X | 0 | X | 0 | 1 | L | N | L | L |
| 1 | 0 | 0 | 0 | 0 | X | 0 | X | 1 | 0 | L | L | L | N |
| 1 | 0 | 0 | 0 | 0 | X | 0 | X | 0 | 0 | L | N | L | N |
| 0 | 1 | 0 | 0 | 0 | X | 0 | X | 1 | 1 | R | R | R | R |
| 0 | 1 | 0 | 0 | 0 | X | 0 | X | 0 | 1 | N | R | R | R |
| 0 | 1 | 0 | 0 | 0 | X | 0 | X | 1 | 0 | R | R | N | R |
| 0 | 1 | 0 | 0 | 0 | X | 0 | X | 0 | 0 | N | R | N | R |
| 0 | 0 | 0 | 1 | 0 | X | 0 | 0 | X | X | A | A | A | A |
| 0 | 0 | 0 | 1 | 0 | X | 0 | 1 | X | X | B | B | A | A |
| 1 | 0 | 0 | 1 | 0 | X | 0 | 0 | 1 | 0 | L | L | L | A |
| 1 | 0 | 0 | 1 | 0 | X | 0 | 0 | 0 | 1 | L | A | L | L |
| 1 | 0 | 0 | 1 | 0 | X | 0 | 0 | 0 | 0 | L | A | L | A |
| 1 | 0 | 0 | 1 | 0 | X | 0 | 1 | 1 | 0 | Y | Y | L | A |
| 1 | 0 | 0 | 1 | 0 | X | 0 | 1 | 0 | 1 | Y | B | L | L |
| 1 | 0 | 0 | 1 | 0 | X | 0 | 1 | 0 | 0 | Y | B | L | A |
| 0 | 1 | 0 | 1 | 0 | X | 0 | 0 | 1 | 0 | R | R | A | R |
| 0 | 1 | 0 | 1 | 0 | X | 0 | 0 | 0 | 1 | A | R | R | R |
| 0 | 1 | 0 | 1 | 0 | X | 0 | 0 | 0 | 0 | A | R | A | R |
| 0 | 1 | 0 | 1 | 0 | X | 0 | 1 | 1 | 0 | K | K | A | R |
| 0 | 1 | 0 | 1 | 0 | X | 0 | 1 | 0 | 1 | B | K | R | R |
| 0 | 1 | 0 | 1 | 0 | X | 0 | 1 | 0 | 0 | B | K | A | R |
| 0 | 0 | 0 | 0 | 1 | X | 0 | X | X | X | H1 | H2 | H1 | H2 |
| 1 | 0 | 0 | 0 | 1 | X | 0 | X | X | X | L | Z | L | Z |
| 0 | 1 | 0 | 0 | 1 | X | 0 | X | X | X | Z | R | Z | R |
| 0 | 0 | 1 | 0 | 1 | X | 0 | X | X | X | H1 | H2 | Q1 | Q2 |
| 1 | 0 | 1 | 0 | 1 | X | 0 | X | X | X | L | Z | Y | Z |
| 0 | 1 | 1 | 0 | 1 | X | 0 | X | X | X | Z | R | Z | K |
| 0 | 0 | 1 | 1 | 1 | X | 0 | 1 | X | X | Q1 | Q2 | H1 | H2 |
| 1 | 0 | 1 | 1 | 1 | X | 0 | 1 | X | X | Y | Z | L | Z |
| 0 | 1 | 0 | 1 | 1 | X | 0 | 1 | X | X | Z | K | Z | R |
| 0 | 0 | 1 | 1 | 1 | X | 0 | 1 | X | X | Q1 | Q2 | Q1 | Q2 |
| 1 | 0 | 1 | 1 | 1 | X | 0 | 1 | X | X | Y | Z | Y | Z |
| 0 | 1 | 1 | 1 | 1 | X | 0 | 1 | X | X | Z | K | Z | K |
| 1 | 0 | 1 | 0 | 0 | X | 0 | X | 1 | 1 | L | L | Y | Y |
| 1 | 0 | 1 | 1 | 0 | X | 0 | 0 | 1 | 1 | L | L | Y | Y |
| 1 | 0 | 1 | 1 | 0 | X | 0 | 1 | 1 | 1 | Y | Y | Y | Y |
| 0 | 1 | 1 | 0 | 0 | X | 0 | X | 1 | 1 | R | R | K | K |
| 0 | 1 | 1 | 1 | 0 | X | 0 | 0 | 1 | 1 | R | R | K | K |
| 0 | 1 | 1 | 1 | 0 | X | 0 | 1 | 1 | 1 | K | K | K | K |
| 1 | 0 | 1 | 0 | 0 | X | 0 | X | 1 | 0 | L | L | Y | B |
| 1 | 0 | 1 | 1 | 0 | X | 0 | 0 | 1 | 0 | L | L | Y | B |
| 1 | 0 | 1 | 1 | 0 | X | 0 | 1 | 1 | 0 | Y | Y | Y | B |
| 0 | 1 | 1 | 0 | 0 | X | 0 | X | 1 | 0 | R | R | B | K |
| 0 | 1 | 1 | 1 | 0 | X | 0 | 0 | 1 | 0 | R | R | B | K |
| 0 | 1 | 1 | 1 | 0 | X | 0 | 1 | 1 | 0 | K | K | B | K |
| 1 | 0 | 1 | 0 | 0 | X | 0 | X | 0 | 1 | L | N | Y | Y |
| 1 | 0 | 1 | 1 | 0 | X | 0 | 0 | 0 | 1 | L | A | Y | Y |
| 1 | 0 | 1 | 1 | 0 | X | 0 | 1 | 0 | 1 | Y | B | Y | Y |
| 0 | 1 | 1 | 0 | 0 | X | 0 | X | 0 | 1 | N | R | K | K |
| 0 | 1 | 1 | 1 | 0 | X | 0 | 0 | 0 | 1 | A | R | K | K |
| 0 | 1 | 1 | 1 | 0 | X | 0 | 1 | 0 | 1 | B | K | K | K |
| 1 | 0 | 1 | 0 | 0 | X | 0 | X | 0 | 0 | L | N | Y | B |
| 1 | 0 | 1 | 1 | 0 | X | 0 | 0 | 0 | 0 | L | A | Y | B |
| 1 | 0 | 1 | 1 | 0 | X | 0 | 1 | 0 | 0 | Y | B | Y | B |
| 0 | 1 | 1 | 0 | 0 | X | 0 | X | 0 | 0 | N | R | B | K |
| 0 | 1 | 1 | 1 | 0 | X | 0 | 0 | 0 | 0 | A | R | B | K |
| 0 | 1 | 1 | 1 | 0 | X | 0 | 1 | 0 | 0 | B | K | B | K |
| 0 | 0 | 1 | 0 | 0 | X | 0 | X | X | X | N | N | B | B |
| 0 | 0 | 1 | 1 | 0 | X | 0 | 0 | X | X | A | A | B | B |
| 0 | 0 | 1 | 1 | 0 | X | 0 | 1 | X | X | B | B | B | B |
| 0 | 0 | 0 | 0 | 0 | 0 | X | X | X | X | N | N | N | N |

FIG. 7A

| 1 | 1 | 0 | 0 | 0 | 0 | 0 | 0 | 0 | 0 | 0 | 0 | 0 | 0 | 0 | 1 |
|---|---|---|---|---|---|---|---|---|---|---|---|---|---|---|---|
| 0 | 1 | 1 | 0 | 0 | 0 | 0 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 | 0 | 0 | 0 |
| 0 | 0 | 0 | 1 | 1 | 0 | 0 | 0 | 0 | 0 | 0 | 0 | 0 | 0 | 0 | 0 |
| 0 | 0 | 0 | 0 | 1 | 1 | 0 | 0 | 0 | 0 | 0 | 0 | 0 | 0 | 0 | 0 |
| 0 | 0 | 0 | 0 | 0 | 1 | 1 | 0 | 0 | 0 | 0 | 0 | 0 | 0 | 0 | 0 |
| 0 | 0 | 0 | 0 | 0 | 0 | 1 | 1 | 0 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 0 | 1 | 1 | 0 | 0 | 0 | 0 | 0 | 0 |
| 0 | 0 | 0 | 0 | 0 | 0 | 0 | 0 | 0 | 1 | 1 | 0 | 0 | 0 | 0 | 0 |
| 0 | 0 | 0 | 0 | 0 | 0 | 0 | 0 | 0 | 0 | 1 | 1 | 0 | 0 | 0 | 0 |
| 0 | 0 | 0 | 0 | 0 | 0 | 0 | 0 | 0 | 0 | 0 | 1 | 1 | 0 | 0 | 0 |
| 0 | 0 | 0 | 0 | 0 | 0 | 0 | 0 | 0 | 0 | 0 | 0 | 1 | 1 | 0 | 0 |
| 0 | 0 | 0 | 0 | 0 | 0 | 0 | 0 | 0 | 0 | 0 | 0 | 0 | 1 | 1 | 0 |
| 0 | 0 | 0 | 0 | 0 | 0 | 0 | 0 | 0 | 0 | 0 | 0 | 0 | 0 | 1 | 1 |
| 1 | 0 | 0 | 0 | 0 | 0 | 0 | 0 | 0 | 0 | 0 | 0 | 0 | 0 | 1 | 1 |

FIG. 7D

| 0 | 0 | 1 | 1 | 1 | 1 | 1 | 1 | 1 | 1 | 1 | 1 | 1 | 1 | 1 | 0 |
|---|---|---|---|---|---|---|---|---|---|---|---|---|---|---|---|
| 1 | 0 | 0 | 1 | 1 | 1 | 1 | 1 | 1 | 1 | 1 | 1 | 1 | 1 | 1 | 1 |
| 1 | 1 | 0 | 0 | 1 | 1 | 1 | 1 | 1 | 1 | 1 | 1 | 1 | 1 | 1 | 1 |
| 1 | 1 | 1 | 0 | 0 | 1 | 1 | 1 | 1 | 1 | 1 | 1 | 1 | 1 | 1 | 1 |
| 1 | 1 | 1 | 1 | 0 | 0 | 1 | 1 | 1 | 1 | 1 | 1 | 1 | 1 | 1 | 1 |
| 1 | 1 | 1 | 1 | 1 | 0 | 0 | 1 | 0 | 1 | 1 | 1 | 1 | 1 | 1 | 1 |
| 1 | 1 | 1 | 1 | 1 | 1 | 0 | 0 | 1 | 1 | 1 | 1 | 1 | 1 | 1 | 1 |
| 1 | 1 | 1 | 1 | 1 | 1 | 1 | 0 | 0 | 1 | 1 | 1 | 1 | 1 | 1 | 1 |
| 1 | 1 | 1 | 1 | 1 | 1 | 1 | 1 | 0 | 0 | 1 | 1 | 1 | 1 | 1 | 1 |
| 1 | 1 | 1 | 1 | 1 | 1 | 1 | 1 | 1 | 0 | 0 | 1 | 1 | 1 | 1 | 1 |
| 1 | 1 | 1 | 1 | 1 | 1 | 1 | 1 | 1 | 1 | 0 | 0 | 1 | 1 | 1 | 1 |
| 1 | 1 | 1 | 1 | 1 | 1 | 1 | 1 | 1 | 1 | 1 | 0 | 0 | 1 | 1 | 1 |
| 1 | 1 | 1 | 1 | 1 | 1 | 1 | 1 | 1 | 1 | 1 | 1 | 0 | 0 | 1 | 1 |
| 1 | 1 | 1 | 1 | 1 | 1 | 1 | 1 | 1 | 1 | 1 | 1 | 1 | 0 | 0 | 1 |
| 0 | 1 | 1 | 1 | 1 | 1 | 1 | 1 | 1 | 1 | 1 | 1 | 1 | 1 | 0 | 0 |

FIG. 7B

| 1 | 0 | 0 | 0 | 0 | 0 | 0 | 0 | 0 | 0 | 0 | 0 | 0 | 0 | 0 | 1 |
|---|---|---|---|---|---|---|---|---|---|---|---|---|---|---|---|
| 0 | 1 | 0 | 0 | 0 | 0 | 0 | 0 | 0 | 0 | 0 | 0 | 0 | 0 | 1 | 0 |
| 0 | 0 | 1 | 0 | 0 | 0 | 0 | 0 | 0 | 0 | 0 | 0 | 0 | 1 | 0 | 0 |
| 0 | 0 | 0 | 1 | 0 | 0 | 0 | 0 | 0 | 0 | 0 | 0 | 1 | 0 | 0 | 0 |
| 0 | 0 | 0 | 0 | 1 | 0 | 0 | 0 | 0 | 0 | 0 | 1 | 0 | 0 | 0 | 0 |
| 0 | 0 | 0 | 0 | 0 | 1 | 0 | 0 | 0 | 0 | 1 | 0 | 0 | 0 | 0 | 0 |
| 0 | 0 | 0 | 0 | 0 | 0 | 1 | 0 | 0 | 1 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 1 | 0 | 1 | 0 | 0 | 0 | 0 | 0 | 0 | 0 |
| 0 | 0 | 0 | 0 | 0 | 1 | 0 | 0 | 0 | 1 | 0 | 0 | 0 | 0 | 0 | 0 |
| 0 | 0 | 0 | 0 | 1 | 0 | 0 | 0 | 0 | 0 | 1 | 0 | 0 | 0 | 0 | 0 |
| 0 | 0 | 0 | 1 | 0 | 0 | 0 | 0 | 0 | 0 | 0 | 1 | 0 | 0 | 0 | 0 |
| 0 | 0 | 1 | 0 | 0 | 0 | 0 | 0 | 0 | 0 | 0 | 0 | 1 | 0 | 0 | 0 |
| 0 | 1 | 0 | 0 | 0 | 0 | 0 | 0 | 0 | 0 | 0 | 0 | 0 | 1 | 0 | 0 |
| 0 | 1 | 0 | 0 | 0 | 0 | 0 | 0 | 0 | 0 | 0 | 0 | 0 | 0 | 1 | 0 |

FIG. 7E

| 1 | 1 | 0 | 0 | 0 | 0 | 0 | 0 | 0 | 0 | 0 | 0 | 0 | 0 | 1 | 1 |
|---|---|---|---|---|---|---|---|---|---|---|---|---|---|---|---|
| 0 | 1 | 1 | 0 | 0 | 0 | 0 | 0 | 0 | 0 | 0 | 0 | 0 | 1 | 1 | 0 |
| 0 | 0 | 1 | 1 | 0 | 0 | 0 | 0 | 0 | 0 | 0 | 0 | 1 | 1 | 0 | 0 |
| 0 | 0 | 0 | 1 | 1 | 0 | 0 | 0 | 0 | 0 | 0 | 1 | 1 | 0 | 0 | 0 |
| 0 | 0 | 0 | 0 | 1 | 1 | 0 | 0 | 0 | 0 | 1 | 1 | 0 | 0 | 0 | 0 |
| 0 | 0 | 0 | 0 | 0 | 1 | 1 | 0 | 0 | 1 | 1 | 0 | 0 | 0 | 0 | 0 |
| 0 | 0 | 0 | 0 | 0 | 0 | 1 | 1 | 1 | 1 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 1 | 1 | 1 | 0 | 0 | 0 | 0 | 0 | 0 | 0 |
| 0 | 0 | 0 | 0 | 0 | 1 | 1 | 0 | 1 | 1 | 0 | 0 | 0 | 0 | 0 | 0 |
| 0 | 0 | 0 | 0 | 1 | 1 | 0 | 0 | 1 | 1 | 0 | 0 | 0 | 0 | 0 | 0 |
| 0 | 0 | 0 | 1 | 1 | 0 | 0 | 0 | 0 | 1 | 1 | 0 | 0 | 0 | 0 | 0 |
| 0 | 0 | 1 | 1 | 0 | 0 | 0 | 0 | 0 | 0 | 1 | 1 | 0 | 0 | 0 | 0 |
| 0 | 0 | 1 | 1 | 0 | 0 | 0 | 0 | 0 | 0 | 0 | 1 | 1 | 0 | 0 | 0 |
| 0 | 1 | 1 | 0 | 0 | 0 | 0 | 0 | 0 | 0 | 0 | 0 | 1 | 1 | 0 | 0 |
| 0 | 1 | 0 | 0 | 0 | 0 | 0 | 0 | 0 | 0 | 0 | 0 | 0 | 1 | 0 | 0 |

VARIABLE VEHICLE SIGNALING SYSTEM

BACKGROUND OF THE INVENTION

1. Field of the Invention

The present invention relates to enhanced signaling systems and more particularly pertains to a new variable vehicle signaling system for actuating a pair of light assemblies on a vehicle in unique modes as a function of different control inputs of the vehicle being triggered.

2. Description of the Prior Art

The use of enhanced signaling systems is known in the prior art. More specifically, enhanced signaling systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art enhanced signaling systems include U.S. Pat. No. 4,029,991; U.S. Pat. No. 5,426,414; U.S. Pat. No. 5,414,407; U.S. Pat. No. 5,442,332; U.S. Pat. No. 5,430,625; and U.S. Pat. No. Des. 313,865.

In these respects, the variable vehicle signaling system according to the present invention substantially departs from the conventional concepts and designs of the prior art, and in so doing provides an apparatus primarily developed for the purpose of actuating a pair of light assemblies on a vehicle in unique modes as a function of different control inputs of the vehicle being triggered.

SUMMARY OF THE INVENTION

In view of the foregoing disadvantages inherent in the known types of enhanced signaling systems now present in the prior art, the present invention provides a new variable vehicle signaling system construction wherein the same can be utilized for actuating a pair of light assemblies on a vehicle in unique modes as a function of different control inputs of the vehicle being triggered.

The general purpose of the present invention, which will be described subsequently in greater detail, is to provide a new variable vehicle signaling system apparatus and method which has many of the advantages of the enhanced signaling systems mentioned heretofore and many novel features that result in a new variable vehicle signaling system which is not anticipated, rendered obvious, suggested, or even implied by any of the prior art enhanced signaling systems, either alone or in any combination thereof.

To attain this, the present invention generally comprises a vehicle having front and rear light assemblies. Each of the light assemblies has a rectangular configuration with a length equal to a width of the vehicle. Note FIG. 3. Further, each light assembly includes a continues matrix of contiguous light emitting diodes each adapted for illuminating upon actuation. As shown in FIG. 3, the front and rear light assemblies are each defined by a right portion and left portion. As such, four light subassemblies of equal size and shape are defined. Situated within the vehicle are a plurality of inputs. Such inputs may include a right and left turn lever, brake pedal, hazard button, head light switch, parking light switch and ignition switch. See FIG. 1. If the vehicle is an emergency vehicle, an emergency mode button is also provided. In use, each input is adapted to transmit an activation signal upon the triggering thereof. Connected between the light assemblies of the vehicle and the inputs is control circuitry. Such circuitry serves to actuate the light emitting diodes of each light subassembly in a unique manner in response to the receipt of activation signals from each different combination of the inputs. In other words, for each combination of inputs that are triggered, there is a unique manner in which the light subassemblies are actuated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new variable vehicle signaling system apparatus and method which has many of the advantages of the enhanced signaling systems mentioned heretofore and many novel features that result in a new variable vehicle signaling system which is not anticipated, rendered obvious, suggested, or even implied by any of the prior art enhanced signaling systems, either alone or in any combination thereof.

It is another object of the present invention to provide a new variable vehicle signaling system which may be easily and efficiently manufactured and marketed.

It is a further object of the present invention to provide a new variable vehicle signaling system which is of a durable and reliable construction.

An even further object of the present invention is to provide a new variable vehicle signaling system which is susceptible of a low cost of manufacture with regard to both materials and labor, and which accordingly is then susceptible of low prices of sale to the consuming public, thereby making such variable vehicle signaling system economically available to the buying public.

Still yet another object of the present invention is to provide a new variable vehicle signaling system which provides in the apparatuses and methods of the prior art some of the advantages thereof, while simultaneously overcoming some of the disadvantages normally associated therewith.

Still another object of the present invention is to provide a new variable vehicle signaling system for actuating a pair of light assemblies on a vehicle in unique modes as a function of different control inputs of the vehicle being triggered.

Even still another object of the present invention is to provide a new variable vehicle signaling system that includes a vehicle with at least one light assembly including an array of lights. Also included is a plurality of inputs situated within the vehicle for generating an activation signal. Control circuitry is connected between the light assembly of the vehicle and the inputs. In use, the control circuitry is adapted to actuate the lights of the light assembly in a unique manner in response to the receipt of activation signals from each combination of the inputs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a table depicting the manner in which the light subassemblies are actuated upon the triggering of various combinations of inputs of the present invention.

Figures 7C, 7F:
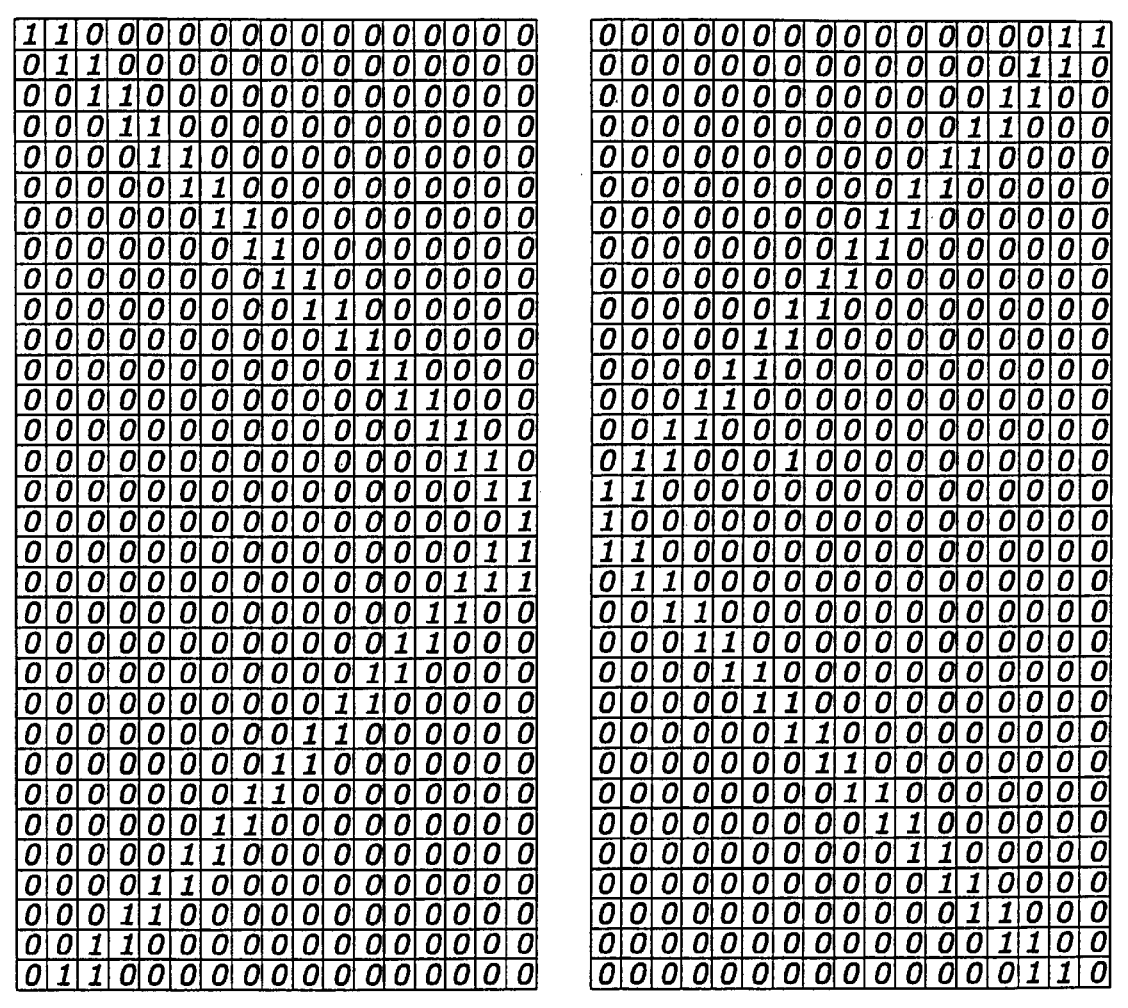

FIGS. 7A–7F shows various examples of the modes in which the lights of the lights assembly of the present invention may be actuated.

DESCRIPTION OF THE PREFERRED EMBODIMENT

Figure 1:
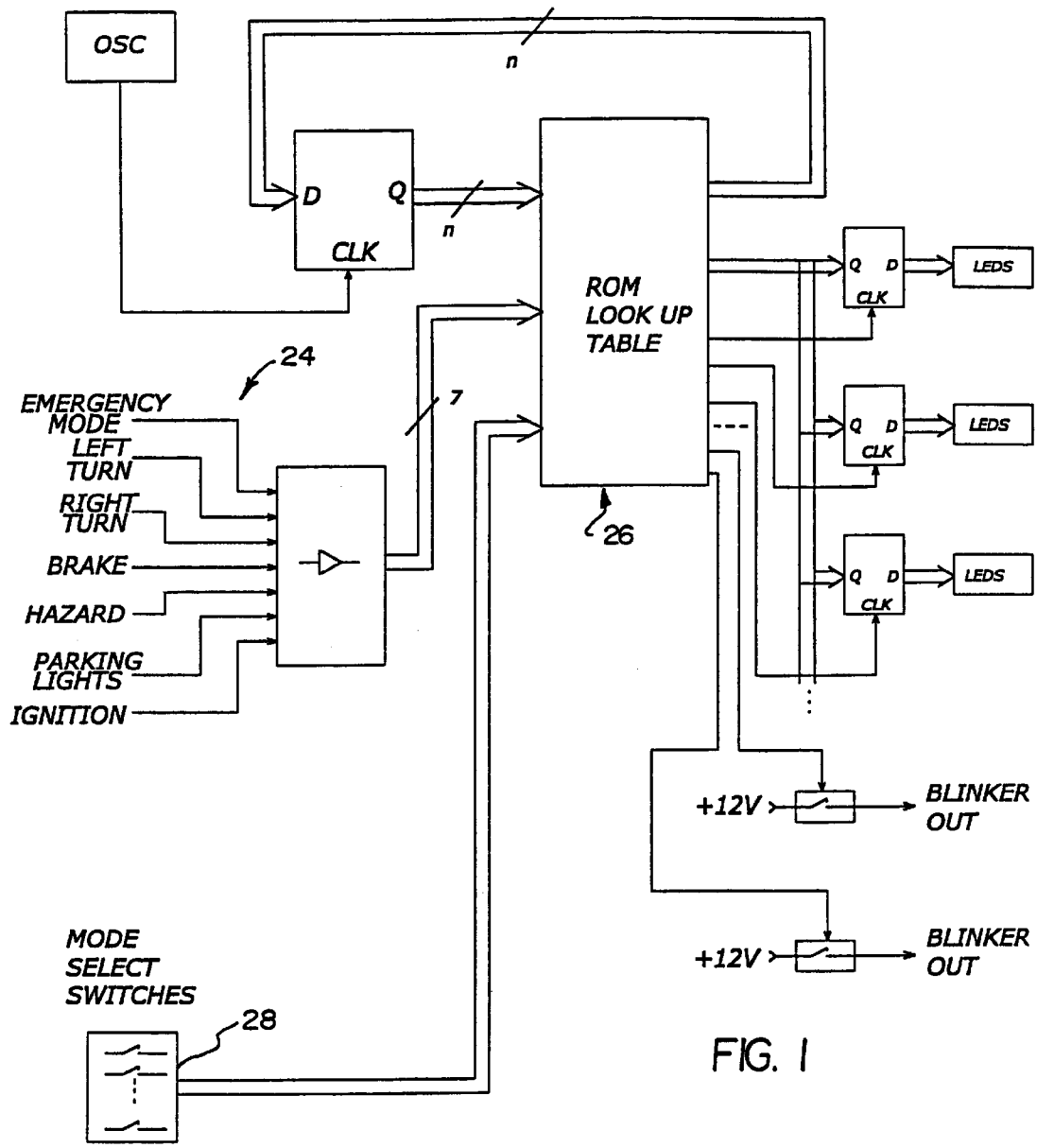
FIG. 1 is a general schematic diagram of a new variable vehicle signaling system according to the present invention.

With reference now to the drawings, and in particular to FIGS. 1 through 7F thereof, a new variable vehicle signaling system embodying the principles and concepts of the present invention and generally designated by the reference numeral 10 will be described.

Figure 3:
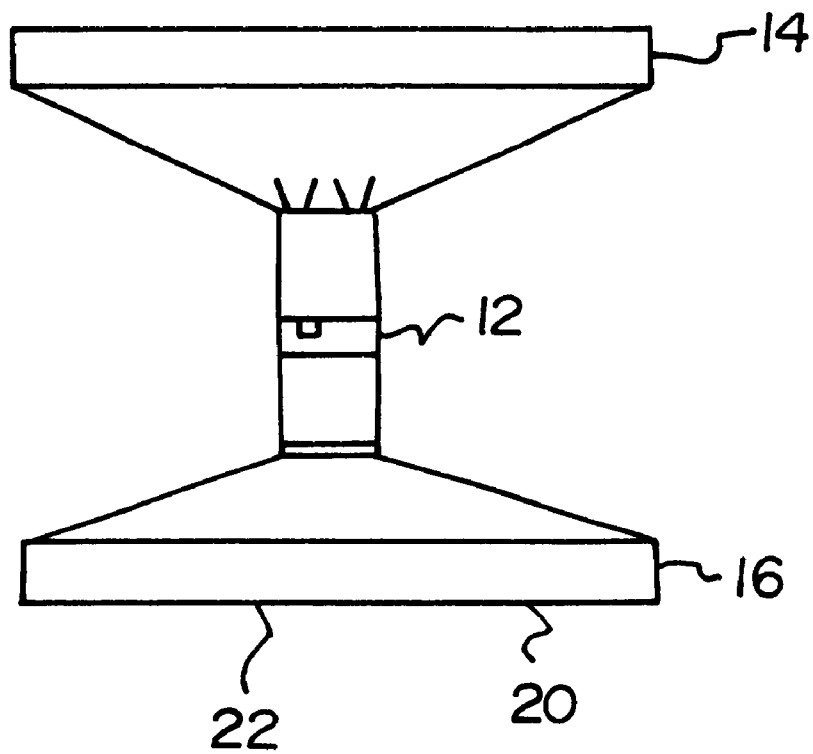
FIG. 3 is a top view of the present invention showing the front and rear light assemblies of the present invention.
Figure 4:
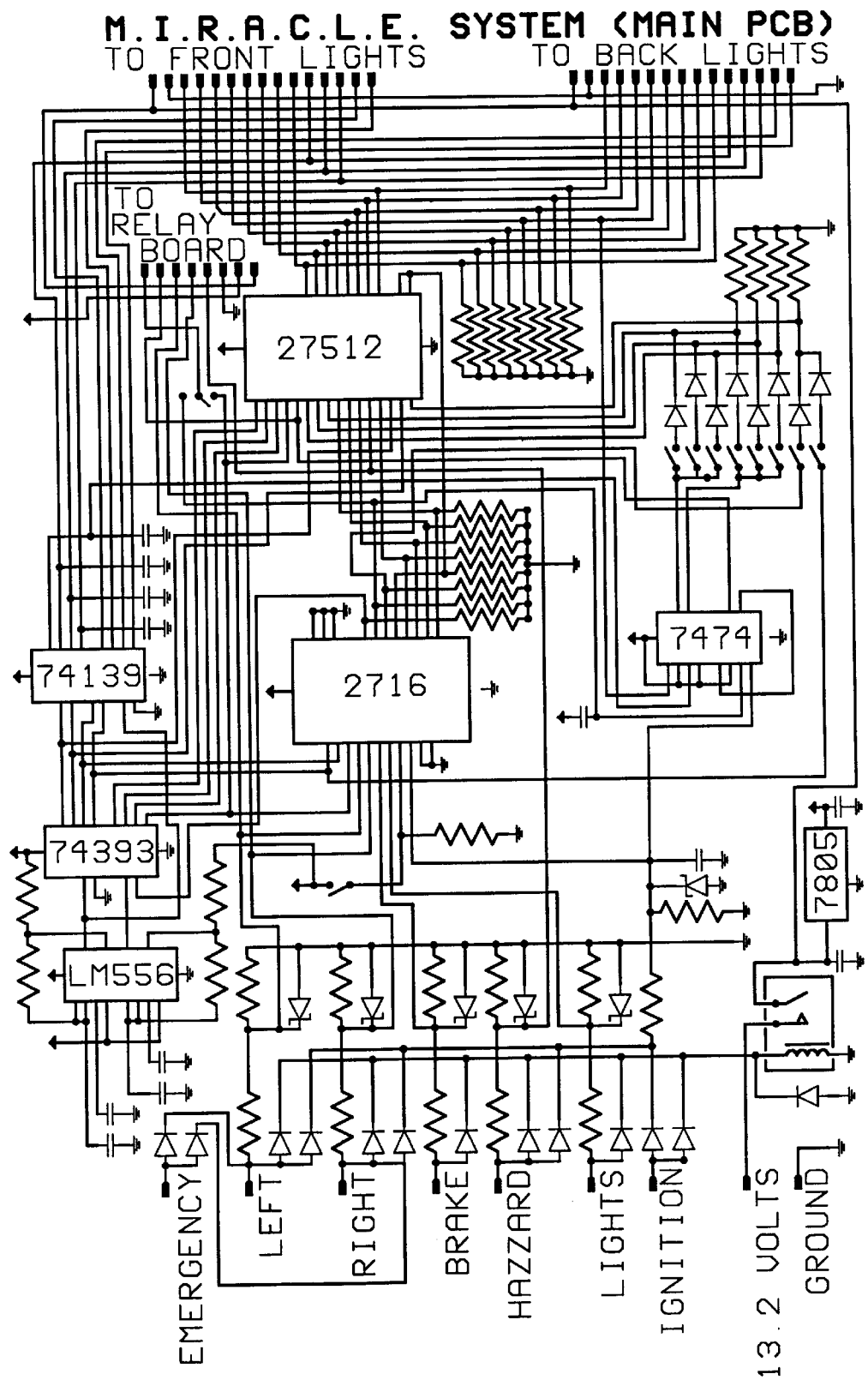
FIGS. 4–6 show detailed circuit diagrams for constructing the control circuitry of the present invention.
Figure 5:
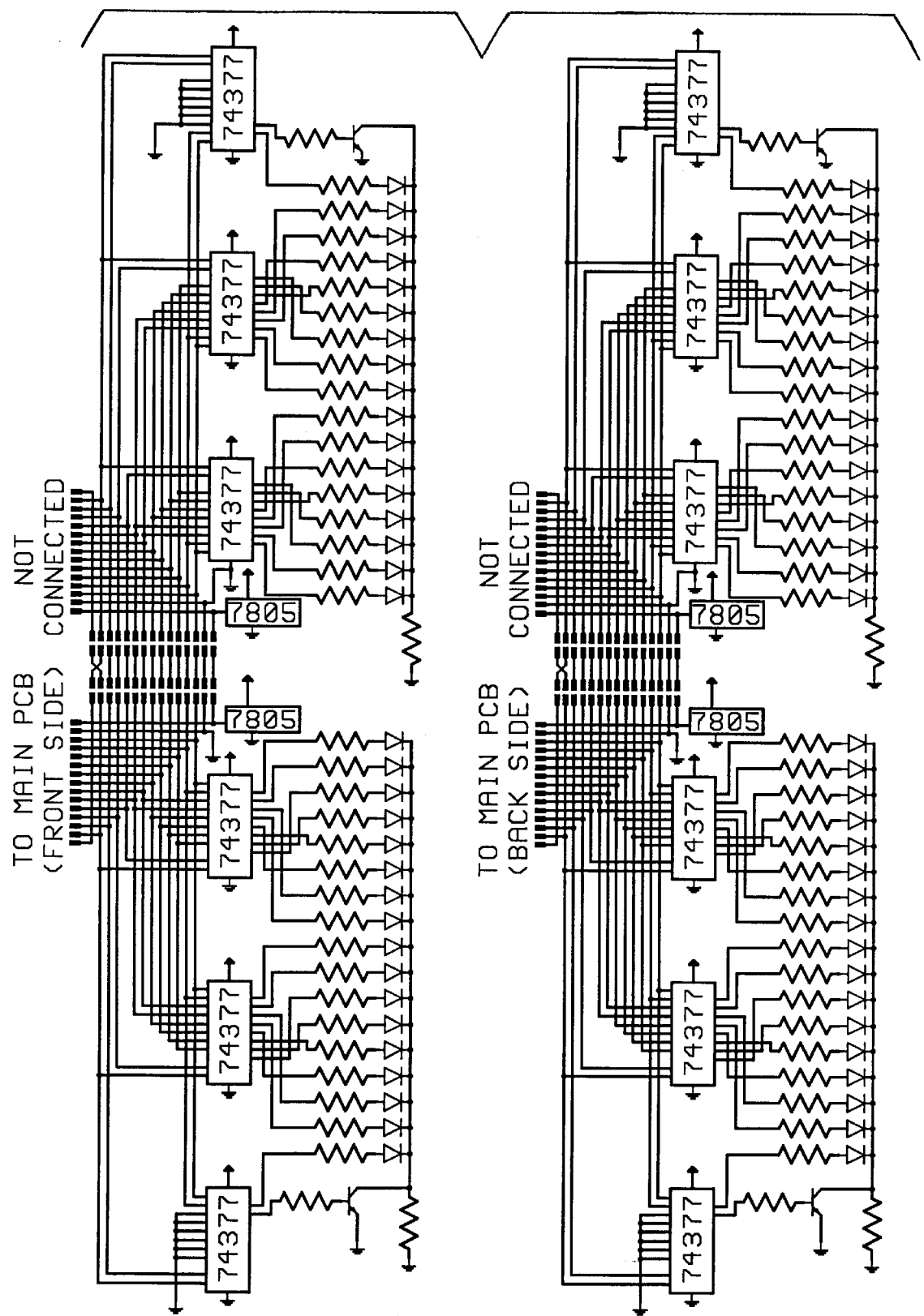
Figure 6:
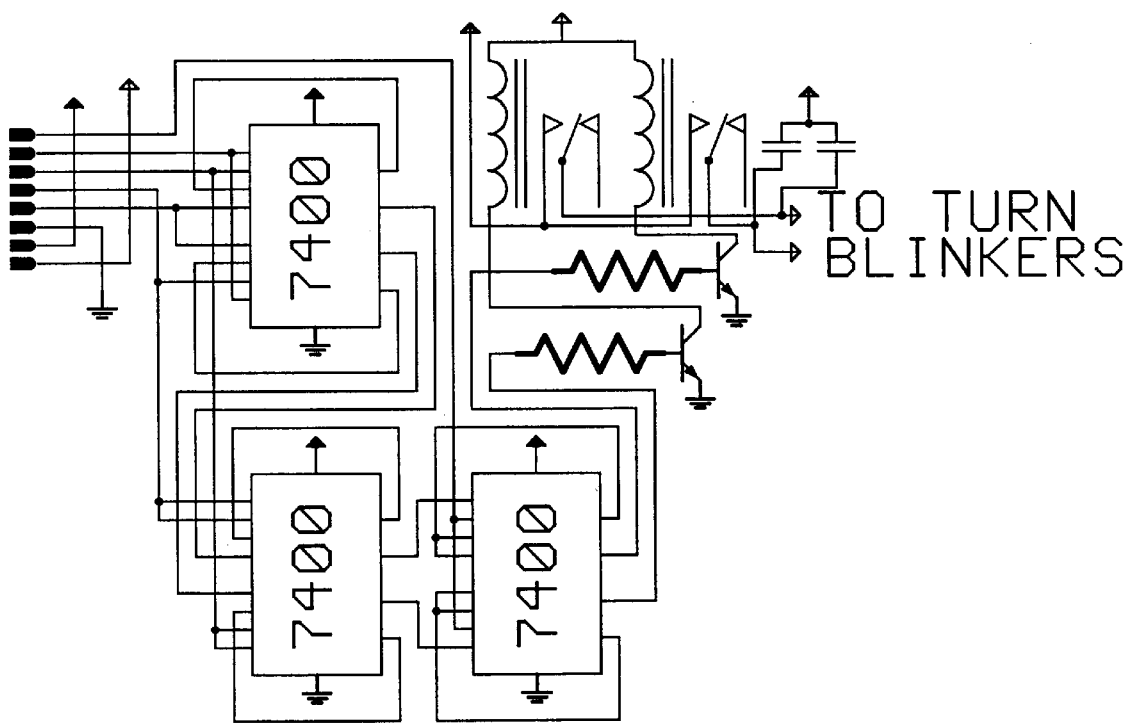

The present invention, designated as numeral 10, includes a vehicle 12 having a front light assembly 14 and a rear light assembly 16. Each of the light assemblies has a rectangular configuration with a length equal to a width of the vehicle. Note FIG. 3. Further, each light assembly includes a continues matrix of contiguous light emitting diodes 18 each adapted for illuminating upon actuation. As shown in FIG. 3, the front and rear light assemblies are each defined by a right portion 20 and left portion 22. As such, four light subassemblies of equal size and shape are defined.

Situated within the vehicle are a plurality of inputs 24. Such inputs may include a right and left turn lever, brake pedal, hazard button, head light switch, parking light switch and ignition switch. See FIG. 1. If the vehicle is an emergency vehicle, an emergency mode button is also provided. In use, each input is adapted to transmit an activation signal upon the triggering thereof.

Connected between the light assemblies of the vehicle and the inputs is control circuitry 26. Such circuitry serves to actuate the light emitting diodes of each light subassembly in a unique manner in response to the receipt of activation signals from different combination of the inputs. In other words, for each combination of inputs that are triggered, there is a unique manner in which the light subassemblies are actuated. In the preferred embodiment, at least a pair of option switches are included for providing options regarding the manner in which the light subassemblies are actuated.

It should be noted that the control circuitry includes a read only memory(ROM) look up table for storing the appropriate control patterns which respond to the activation signals from the each combination of inputs. A delineation of the ROM look up table is set forth in FIG. 2. As set forth in the legend, each light subassembly may be illuminated in ten different modes. A description of the nature of the actuation of the light emitting diodes in each mode is as follows.

In the context of the following discussion, it should be noted that a "dot" represents the illumination of a single light emitting diode, wherein adjacent light emitting diodes actuate sequentially to afford the appearance that the diodes are moving laterally. The "bar" merely represents multiple adjacent light emitting diodes being illuminated in a manner similar to that of the dots. Its should be noted that the dots or bars may be scrolled in opposite directions. This behavior is denoted by subscripts 1 and 2 in the following discussion.

Brake (B)
    All light emitting diodes are brightly actuated.
Normal or Nothing (N)
    All light emitting diodes are not actuated.
Brake and Turn (K or Y)
    All light emitting diodes are brightly actuated while a portion of the light emitting diodes in the shape of a bar or dot are deactuated and scrolled to one side of the light assembly. See FIG. 7D for "Right Brake(K)".
Normal Turn (R or L)
    All light emitting diodes are not actuated while a portion of the light emitting diodes in the shape of a bar or dot are brightly actuated and scrolled to one side of the light assembly. See FIG. 7A for "Right turn (R)".
Parking Lights On (A)
    All light emitting diodes are dimly actuated. This may be accomplished by simply decreasing the current to the light emitting diodes.
Daytime Running or Sparkle Mode (S1 and S2)
    All of the light emitting diodes are intermittently and randomly actuated.
Emergency Mode (E1 and E2)
    All of the light emitting diodes are flashed in a unique manner Brake and Hazard (Q1 and Q2)
   All light emitting diodes are brightly actuated while a portion of the light emitting diodes in the shape of two dots or bars are deactuated and scrolled both starting from the middle of the light assembly and each one going to opposite ends of the assembly and back to the middle.

Hazard (H1 and H2)
   All light emitting diodes are not actuated while a portion of the light emitting diodes in the shape of two dots or bars are brightly actuated and scrolled both starting from the middle of the light assembly and each one going to opposite ends of the assembly and back to the middle. See FIGS. 7C & 7F for "Hazard H1 and H2", respectively.

Hazard and Turn (Z)
   All light emitting diodes are not actuated while a portion of the light emitting diodes in the shape of two dots or bars are brightly actuated and scrolled one from the middle, one from the far side of the light assembly so that they meet roughly a quarter way inside the assembly and back to where they started.
   See FIGS. 7B and 7E for "Hazard and Turn (Z)".

As shown in the Table of FIG. 2, each combination of inputs trigger each of the light subassemblies in a unique manner to distinguish between various driving situations. For varying parameters associated with the actuation of the light emitting diodes, mode selection switches 28 are connected to the control circuitry. These mode selection switches function to determine the size of the dots and bars, etc. For example, the mode switches would be capable of changing the operation of the present invention from that shown in FIG. 7B to that shown in FIG. 7E. In alternate embodiments, fog lights and conventional blinkers may be incorporated with the front and rear light assemblies for affording additional combinations, or modes of operation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle signaling system comprising, in combination:
   a vehicle having front and rear light assemblies, each of the light assemblies having a rectangular configuration with a length equal to a width of the vehicle and including a continuous matrix of contiguous light emitting diodes each adapted for illuminating upon the actuation thereof, wherein the front and rear light assemblies are each defined by a right portion and left portion, thereby defining four light subassemblies;
   a plurality of inputs situated within the vehicle and including an emergency mode button, right and left turn lever, brake pedal, hazard button, head light switch, parking light switch and ignition switch, each input adapted to transmit an activation signal upon the triggering thereof;
   control means connected between the light assemblies of the vehicle and the inputs, the control means adapted to actuate the light emitting diodes of each light subassembly in a unique manner in response to the receipt of activation signals from each different combination of the inputs such that each of the inputs producing the activation signals is represented on each of the light assemblies;
   mode selection means connected to the control means for selecting from a plurality of modes of actuating the light emitting diodes based upon receipt of activation signals from the plurality of inputs and varying various parameters associated with the actuation of the light emitting diodes;
   a first one of said plurality of modes comprising a brake mode wherein all light emitting diodes are actuated;
   a second one of said plurality of modes comprising a normal mode wherein all light emitting diodes are not actuated;
   a third one of said plurality of modes comprising a brake and turn mode wherein all light emitting diodes are actuated while a portion of the light emitting diodes are deactuated and scrolled to one side of the light assembly;
   a fourth one of said plurality of modes comprising a turn mode wherein all light emitting diodes are not actuated while a portion of the light emitting diodes are actuated and scrolled to one side of the light assembly;
   a fifth one of said plurality of modes comprising a parking lights on mode wherein all light emitting diodes are dimly actuated;
   a sixth one of said plurality of modes comprising a daytime running mode wherein all of the light emitting diodes are intermittently and randomly actuated;
   a seventh one of said plurality of modes comprising an emergency mode wherein all of the light emitting diodes are flashed in a unique manner; and
   an eighth one of said plurality of modes comprising a brake and hazard mode wherein all light emitting diodes are actuated while two portions of the light emitting diodes are deactuated and scrolled both starting from the middle of the light assembly and each one going to opposite ends of the assembly and back to the middle.

2. A vehicle signaling system comprising:
   a vehicle having at least one light assembly including an array of lights arranged in a continuous matrix of lights each adapted for illuminating upon the actuation of the lights, wherein the wherein the light assembly is defined by a right portion and left portion;
   a plurality of inputs situated within the vehicle each for generating an activation signal, the plurality of inputs including an emergency mode button, right and left turn lever brake pedal, hazard button, head light switch, parking light switch and ignition switch, each input being adapted to transmit the activation signal upon the triggering of the respective input; and control means connected between the light assembly of the vehicle and the inputs, the control means being adapted to actuate the lights of the light assembly in a unique manner in response to the receipt of activation signals from each combination of the inputs such that each of the inputs producing the activation signals is represented on the light assembly;

mode selection means connected to the control means for selecting from a plurality of modes of actuating the lights based upon receipt of activation signals from the plurality of inputs;

a first one of said plurality of modes comprising a brake mode wherein substantially all lights are actuated;

a second one of said plurality of modes comprising a normal mode wherein substantially all lights are not actuated;

a third one of said plurality of modes comprising a brake and turn mode wherein substantially all lights are actuated while a portion of the lights are deactuated and scrolled to one side of the light assembly;

a fourth one of said plurality of modes comprising a turn mode wherein substantially all lights are not actuated while a portion of the lights are actuated and scrolled to one side of the light assembly;

a fifth one of said plurality of modes comprising a parking lights on mode wherein substantially all lights are dimly actuated;

a sixth one of said plurality of modes comprising a daytime running mode wherein substantially all of the lights are intermittently and randomly actuated;

a seventh one of said plurality of modes comprising an emergency mode wherein substantially all of the lights are flashed in a unique manner; and an eighth one of said plurality of modes comprising a brake and hazard mode wherein substantially all lights are actuated while two portions of the lights are deactuated and scrolled both starting from the middle of the light assembly and each one going to opposite ends of the assembly and back to the middle.

3. A vehicle signaling system as set forth in claim 2 wherein each of the lights of the light assembly comprises a light emitting diode.

4. A vehicle signaling system as set forth in claim 2 wherein the lights of the light assembly are contiguous.

5. A vehicle signaling system as set forth in claim 2 wherein the light assembly has a length equal to a width of the vehicle.

* * * * *